United States Patent
Iwasawa

(10) Patent No.: US 8,150,688 B2
(45) Date of Patent: Apr. 3, 2012

(54) VOICE RECOGNIZING APPARATUS, VOICE RECOGNIZING METHOD, VOICE RECOGNIZING PROGRAM, INTERFERENCE REDUCING APPARATUS, INTERFERENCE REDUCING METHOD, AND INTERFERENCE REDUCING PROGRAM

(75) Inventor: Toru Iwasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 936 days.

(21) Appl. No.: 12/087,573

(22) PCT Filed: Jan. 10, 2007

(86) PCT No.: PCT/JP2007/050157
§ 371 (c)(1),
(2), (4) Date: Jul. 10, 2008

(87) PCT Pub. No.: WO2007/080886
PCT Pub. Date: Jul. 19, 2007

(65) Prior Publication Data
US 2010/0169089 A1    Jul. 1, 2010

(30) Foreign Application Priority Data

Jan. 11, 2006   (JP) .................................. 2006-003650

(51) Int. Cl.
*G10L 15/20*  (2006.01)
*G10L 21/02*  (2006.01)
*G10L 19/14*  (2006.01)

(52) U.S. Cl. ......................... 704/233; 704/226; 704/234

(58) Field of Classification Search ........................ None
See application file for complete search history.

(56) References Cited

U.S. PATENT DOCUMENTS

| | | | | |
|---|---|---|---|---|
| 5,953,699 A | * | 9/1999 | Takagi | 704/238 |
| 6,785,648 B2 | * | 8/2004 | Menendez-Pidal et al. | 704/233 |
| 6,865,531 B1 | * | 3/2005 | Huang | 704/226 |
| 7,366,309 B2 | | 4/2008 | Sato et al. | |
| 7,478,041 B2 | * | 1/2009 | Ichikawa et al. | 704/233 |
| 2008/0071540 A1 | * | 3/2008 | Nakano et al. | 704/251 |

FOREIGN PATENT DOCUMENTS

| | | |
|---|---|---|
| JP | 05-158494 | 6/1993 |
| JP | 07-191696 | 7/1995 |
| JP | 10-133688 | 5/1998 |
| JP | 2000-010593 A | 1/2000 |
| JP | 2003-241791 A | 8/2003 |
| JP | 2005-250397 A | 9/2005 |

* cited by examiner

*Primary Examiner* — Brian Albertalli
(74) *Attorney, Agent, or Firm* — Foley & Lardner LLP

(57) ABSTRACT

A voice recognizing apparatus includes a microphone 12 which inputs an input voice including speech voice uttered by a user speaker and interference voice uttered by an interference speaker other than the user speaker, superimposition amount determining unit 14 which determines a noise superimposition amount for the input voice on the basis of a speech voice and an interference voice separately input as the input voice, a noise superimposing unit 16 which superimposes noise according to the noise superimposition amount onto the input voice and outputs the resultant voice as noise-superimposed voice; and a voice recognizing unit 18 which recognizes the noise-superimposed voice.

25 Claims, 14 Drawing Sheets

FIG. 2

| INPUT VOICE AVERAGE POWER / INTERFERENCE VOICE AVERAGE POWER | LESS THAN 500 | 500~1000 | 1000~5000 | 5000 OR MORE |
|---|---|---|---|---|
| LESS THAN 500 | 0 | 100 | 200 | 200 |
| 500~1000 | 0 | 100 | 200 | 300 |
| OVER 1000 | 0 | 100 | 200 | 500 |

VOICE RECOGNIZING APPARATUS, VOICE RECOGNIZING METHOD, VOICE RECOGNIZING PROGRAM, INTERFERENCE REDUCING APPARATUS, INTERFERENCE REDUCING METHOD, AND INTERFERENCE REDUCING PROGRAM

This application is the National Phase of PCT/JP2007/050157, filed Jan. 10, 2007, which claims priority to Japanese Application No. 2006-003650, filed Jan. 11, 2006, the disclosures of which are hereby incorporated by reference in their entirety.

TECHNICAL FIELD

The present invention relates to a voice recognizing apparatus, a voice recognizing method, a voice recognizing program, an interference reducing apparatus, an interference reducing method, and an interference reducing program. More particularly, the invention relates to a voice recognizing apparatus, a voice recognizing method, and a voice recognizing program for recognizing an input voice including a voice uttered by a user speaker and a voice uttered by an interference speaker other than the user speaker, and to an interference reducing apparatus, an interference reducing method, and an interference reducing program.

BACKGROUND ART

In the case of recognizing a voice in real environment, there is a problem such that when an utterance voice uttered by the user is influenced by an utterance voice uttered by another person (hereinbelow, called "interfering uttered voice") and ambient noise, recognition precision deteriorates. As a method of reducing the influence of ambient noise, a method of emphasizing a voice by using a noise canceller and a microphone array is being studied but does not reach complete elimination of noise. One of methods of increasing recognition precision by reducing the influence of ambient noise is a method of suppressing the influence of ambient noise by superimposing weak white noise on an input voice. In the case where ambient noise is weaker than an uttered voice, by whitening the ambient noise with white noise superimposition, the influence can be reduced.

A conventional voice recognizing system using white noise is disclosed in, for example, a patent document 1. The conventional voice recognizing system described in the document has a voice detector for calculating voice-likeness level frame by frame at the time of voice recognition and performs a process of superimposing white noise onto an interval in which voice-likeness level is determined to be low. The conventional voice recognizing system is directed to suppress deterioration in the precision of voice recognition by superimposing noise on a silent interval in voice recognition.

It is known that there is a case that the precision of voice recognition is improved by superimposing weak white noise on an input voice to be recognized.

Patent Document 1: Japanese Unexamined patent publication No. H7-191696.

DISCLOSURE OF THE INVENTION

However, in the conventional technique described in the above document, the situation that the power of white noise to be superimposed is increased excessively leads to a problem that distortion in the input voice increases and the precision of voice recognition deteriorates.

In the case of applying the conventional technique described in the above document to voice recognition in which simultaneous utterance is expected, there is room for improvement in the following viewpoints.

First, in the case where an interference utterance voice is superimposed in an utterance interval of the input voice, there is the possibility that the recognition precision is not improved. The reason is that the voice interval on which the interference utterance voice is superimposed is determined as utterance, and the white noise superimposing process is not performed. Therefore, in the case where the simultaneous utterance voice recognition for recognizing voices simultaneously uttered by a plurality of speakers is performed or in the case where a plurality of speakers in the same space perform operation of different voice recognizing systems using different microphones, it is difficult to avoid the influence when the interference utterance voice is leaked in the microphone of the user.

Second, when the interference utterance voice leaks in the microphone in the case where the speaker utters no voice during voice recognition, a problem that an improper voice recognition result is output also occurs. Particularly, in the case where the user speaker and the others use the same voice recognizing system and receive common voice recognition words, the interference utterance voice is often a word to be recognized. A problem also occurs that when a leaked-in voice is accurately recognized, a reaction which is not intended by the user speaker appears.

The present invention has been achieved in view of the circumstances and an exemplary object of the invention is to provide a voice recognizing system assuming that a plurality of speakers simultaneously speak in the same place, realizing improvement in voice recognition precision in the case where uttered voices overlap and suppression of output of a improper voice recognition result due to an interference utterance voice.

According to the present invention, there is provided an interference reducing apparatus including:

a superimposition amount determining unit, in the case of receiving a voice including an utterance voice uttered by a user speaker and an interference signal, which estimates an interference component that interferes with recognition of the voice from information based on a position of a speaker or an utterance distance, and obtains a reduction signal of reducing influence of the interference component in the recognition of the voice by superimposing said reduction signal onto the voice; and a reduction signal superimposing unit which superimposes the reduction signal on the voice and outputs the superimposed voice.

According to the present invention, when a human previews to a voice in which an interference signal exists, a target voice can be easily distinguished.

The above described interference reducing apparatus may further include a speaker position measuring unit which detects a position of a speaker whose voice should be input and outputs the position to the superimposition amount determining unit The superimposition amount determining unit may determine the reduction signal using a distance between a user speaker obtained from the speaker position and an interference speaker as information based on the position of the speaker.

In the above described interference reducing apparatus, the reduction signal may be white noise.

According to the present invention, there is provided a voice recognizing apparatus including the above described interference reducing apparatus, further including a voice recognizing unit which performs a voice recognizing process on the superimposed voice.

According to the invention, in the voice recognizing apparatus assuming that a plurality of speakers speak simultaneously, a voice (interference signal) of an interference speaker leaked in a microphone is whitened in a range where the influence on recognition of a voice (uttered voice) of the user speaker is small, and the influence on the voice recognition, of the voice (interference signal) of the interference speaker can be reduced. Thus, the voice recognition precision in the case where a plurality of uttered voices overlap can be improved.

By superimposing noise of a proper power on the input voice, the voice (interference signal) of the interference speaker leaked in the microphone is whitened. Consequently, the possibility that an improper voice recognition result is output due to leak of the voice (interference signal) of the interference speaker in the microphone can be reduced.

In the voice recognizing apparatus, the superimposition amount determining unit may include: an utterance detecting unit which detects whether the uttered voice is included in the first input voice or not; and an interference signal detecting unit which detects whether the interference signal which exerts an influence on the recognition is included in the second input signal or not. The reduction signal for the interference component may be obtained from the uttered voice obtained in the case where the uttered voice is detected and the interference signal is not detected and the interference signal obtained in the case where the interference signal is detected and the uttered voice is not detected.

With the configuration, two microphones are provided. A voice of the user speaker is received by one of the microphones (input unit), and a voice of the interference speaker is received by the other microphone (second input unit). After obtaining the input voice of the interference speaker, the superimposition amount for the input voice of the user speaker is determined on the basis of the input voices of the user speaker and the interference speaker and is superimposed on the input voice of the user speaker. By the operation, the voice of an interference speaker leaked in the microphone of the user speaker is whitened in the range where the influence on recognition of the voice of the user speaker is small, and the influence on the voice recognition of the voice of the interference speaker can be reduced. Thus, the precision of voice recognition in the case where a plurality of utterances overlap can be improved.

According to the present invention, there is provided a voice recognizing apparatus including the above described interference reducing apparatus, wherein an input voice has a plurality of channels, and the voice recognizing apparatus includes: a plurality of superimposition amount determining units which determine a plurality of said noise superimposition amounts for the plurality of channels of the input voice, respectively, on the basis of the plurality of channels of the input voice; a plurality of noise superimposing units which superimpose a plurality of noises according to the plurality of noise superimposition amounts for the plurality of channels of the input voice by the plurality of corresponding channels of the input voice, and output a plurality of noise-superimposed voices; and a plurality of voice recognizing units which recognize the plurality of noise-superimposed voices, respectively.

With the configuration, in the voice recognizing system assuming that a plurality of speakers simultaneously speak, voices of a plurality of speakers are input by using input voices in a plurality of channels and, from a result of input from its channel to the other channels, the voice input to its channel can be accurately recognized. Further, a noise which can prevent a voice leaked in from the other channels from being properly recognized is determined channel by channel. By superimposing the noise channel by channel, the precision of voice recognition in the case where voices uttered by a plurality of speakers overlap and suppression of output of an improper voice recognition result due to an interference utterance voice can be realized.

The above-described voice recognizing apparatus may further include a superimposition amount storing unit which previously stores an optimum noise superimposition amount associated with a relation of characteristic amounts of the utterance voice uttered by the user speaker and the interference signal uttered by the interference speaker. The plurality of superimposition amount determining units may obtain the characteristic amounts of an input voice of one of the plurality of channels as the utterance voice and input voices of the other channels as the interference signals, obtain the plurality of noise superimposition amounts corresponding to the relation of the characteristic amounts of the utterance voice and the interference signals with reference to the superimposition amount storing unit, and determine them as a plurality of noise superimposition amounts for the plurality of channels of the input voice.

The above-described voice'recognizing apparatus may further include a speaker position measuring unit which detects a position of a speaker whose voice should be input and outputs the position to the superimposition amount determining unit. The superimposition amount determining unit may determine the noise superimposition amount in accordance with the position of the speaker obtained from the speaker position measuring unit.

The interference reducing apparatus may further include an utterance distance measuring unit which measures an utterance distance between a speaker whose voice should be input and the receiving unit and outputs the obtained utterance distance to the superimposition amount determining unit. The superimposition amount determining unit may determine the reduction signal by using the utterance distance as information based on the utterance distance of the speaker.

According to the present invention, there is provided an interactive robot including the above-described voice recognizing apparatus, wherein the robot executes speech and behavior according to a voice recognition result output from the voice recognizing unit.

According to the present invention, there is provided an interactive robot connected to a server for performing a voice recognizing process via a network, wherein the server includes the above-described voice recognizing apparatus and outputs a voice recognition result output from the voice recognizing unit to the robot via the network.

According to the present invention, there is provided an interference reducing method including: in the case of receiving a voice including an utterance voice uttered by a user speaker and an interference signal, estimating an interference component which interferes with recognition of the voice; from information based on a position of a speaker or an utterance distance, and obtaining a reduction signal of reducing the influence of the interference component in the recognition of the voice by bring superimposed on the voice by superimposing said reduction signal onto said voice; and superimposing the reduction signal on the voice and outputting the superimposed voice.

According to the present invention, there is provided a voice recognizing method using the interference reducing method, including performing a voice recognizing process on the superimposed voice.

According to the present invention, there is provided an interference reducing program for making a computer function as: in the case of receiving a voice including a voice uttered by a user speaker and an interference signal,
  a unit which estimates an interference component which interferes with recognition of the voice, from information based on a position of a speaker or an utterance distance, and obtains a reduction signal of reducing influence of the interference component in the recognition of the voice by superimposing said reduction signal onto said voice; and
  a unit which superimposes the reduction signal on the voice and outputs the superimposed voice.

According to the present invention, there is provided a voice recognizing program including the above-described interference reducing program, for making a computer function as a unit which performs a voice recognizing process on the superimposed voice.

According to the present invention, there are provided a voice recognizing apparatus, a voice recognizing method, and a voice recognizing program realizing improvement in the precision of voice recognition in the case where utterances overlap and suppression of output of an improper voice recognition result caused by interference utterance voice in a voice recognizing system assuming that a plurality of speakers utter simultaneously in the same location.

BRIEF DESCRIPTION OF THE DRAWINGS

The above and other objects, features, and advantages will become more apparent from the following exemplary embodiments and the appended drawings.

FIG. 2 is a diagram showing an example of a matrix used by a superimposing amount determining unit in the voice recognizing apparatus of FIG. 1.

BEST MODE FOR CARRYING OUT THE INVENTION

Figure 1:
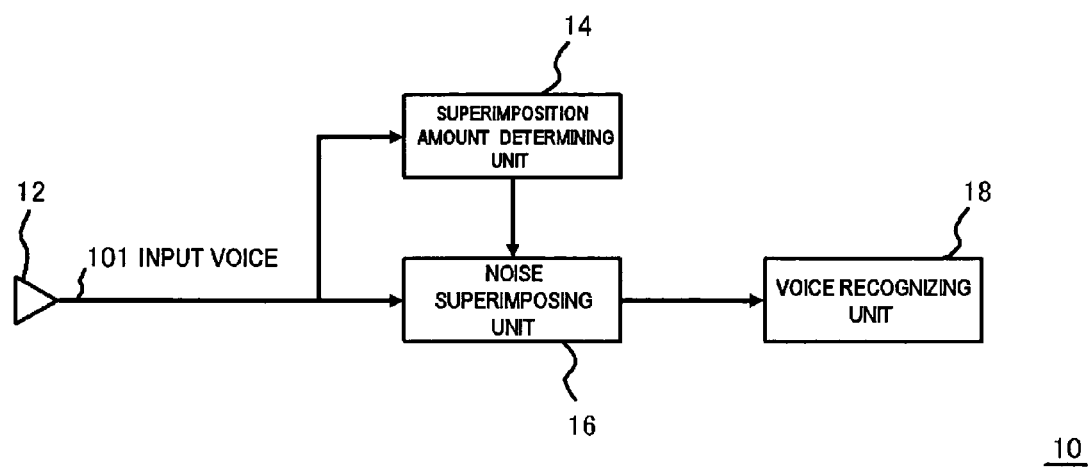
FIG. 1 is a functional block diagram showing the configuration of a voice recognizing apparatus according to an exemplary embodiment of the present invention.

Exemplary embodiments of the present invention will be described below with reference to the drawings. In all of the drawings, similar reference numerals are designated to similar components and description will not be repeated.

First Exemplary Embodiment

FIG. 1 is a functional block diagram showing the configuration of a voice recognizing apparatus as an exemplary embodiment of the present invention. A voice recognizing apparatus 10 of the exemplary embodiment has: a superimposition amount determining unit (superimposition amount determining unit 14) which, in the case of receiving voice (input voice 101) including an utterance voice uttered by a user speaker and an interference signal, on the basis of an interference component which interferes with recognition of the voice, obtains a reduction signal of reducing the influence of the interference component in the recognition of the voice by superimposing the reduction signal onto the voice; a reduction signal superimposing unit (noise superimposing unit 16) which superimposes the reduction signal on the voice and outputs superimposed voice; and a voice recognizing unit 18 which performs a voice recognizing process on the superimposed voice.

The components of the voice recognizing apparatus 10 are realized by an arbitrary combination of hardware and software mainly by a CPU of an arbitrary computer, a memory, a program realizing the components of the diagram and loaded to the memory, a storing unit such as a hard disk that stores the program, and an interface for connection to a network. A person skilled in the art will understand that there are various modifications of the realizing method and the apparatus. The diagrams described below show blocks on the function unit basis, not the configurations on the hardware unit basis.

The voice recognition program of the present invention makes a computer function as: a unit (microphone 12) for inputting the input voice 101 including speaker voice uttered by the user speaker and interference voice uttered by an interference speaker other than the user speaker; a unit (superimposition determining unit 14) for determining a noise superimposition amount for the input voice 101 on the basis of the speaker voice and the interference voice separately input as the input voice 101; a unit (noise superimposition unit 16) for superimposing noise according to the noise superimposition amount on the input voice 101 and outputting the resultant voice as noise-superimposed voice; and a unit (voice recognizing unit 18) for recognizing the noise-superimposed voice.

In FIG. 1, the microphone 12 is a device such as a microphone. The input voice 101 is voice data obtained via the microphone 12. The superimposition amount determining unit 14 obtains voice uttered by the user speaker and leaked voice uttered by an interference speaker who is not the user speaker separately input as the input voice 101, and determines a power of white noise to be superimposed from characteristic amounts of the powers or the like.

The noise superimposing unit 16 superimposes the white noise of the power determined by the superimposition amount determining unit 14 onto the input voice 101 and outputs the resultant voice. The voice obtained by superimposing the white noise on the input voice 101 is recognized by the voice recognizing unit 18. The voice recognizing unit 18 recognizes the voice output from the noise superimposing unit 16.

Using the calculated characteristic amounts, the white noise superimposition power has to be set to a magnitude at which the influence is not exerted on the input voice and the influence of the interference voice exerted on the voice recognition is suppressed maximally. As a method of determining the white noise superimposition power, there is a method of using a matrix of white noise superimposition amounts for the characteristic amounts of the input voice and the interference voice, determined in advance by experiments. Specifically, the method is to calculate an optimum white noise superimposition amount by collating the matrix with the characteristic amounts of the input voice and the interference voice input to a system. The matrix is generated by dividing the characteristic amounts of the input voice and the interference voice in a continuous range and determining a white noise superimposition amount at which balance of voice recognition precision and suppression of an unnecessary voice recognition result caused by the interference voice is excellent by simulation or the like.

First, the superimposition amount determining unit 14 digitizes the input voice 101. For example, the superimposition amount determining unit 14 quantizes the input voice 101 by 16 bits, thereby generating digital voice data. In the case of 16 bits, the voice data is expressed as a numerical value sequence of −32768 to 32768. The superimposition amount determining unit 14 identifies the uttered voice and the interference utterance voice on the basis of the above-described reference data from the digital voice data. The superimposition amount determining unit 14 obtains the maximum value of the absolute value of the power of each voice as the maximum power, or may obtain an average of maximum powers. In such a manner, the superimposition amount determining unit 14 calculates the characteristic amounts such as the maximum powers of the user speaker utterance voice and the interference utterance voice as leaked voice which are separately input as the input voice 101, and the average power of the maximum powers.

As a method of determining the white noise superimposition power, there is a method of determining the optimum value on the basis of the matrix which is determined in advance by experiments from the calculated characteristic amounts. Values embedded in the matrix determined by experiments are determined by simulating the white noise superimposition power at which the voice recognition precision and the effect of suppressing unnecessary voice recognition result outputs caused by the interference utterance voice is the maximum every range of the characteristic amounts of the input voices.

FIG. 2 shows a brief example of the matrix. The voice recognizing apparatus 10 of the exemplary embodiment has the superimposition amount storing unit (the matrix of FIG. 2) for previously storing optimum noise superimposition amounts associated with the relation of the characteristic amounts between the speaker voice uttered by the user speaker and the interference voice uttered by the interference speaker. The superimposition amount determining unit 14 obtains the characteristic amount of each of the speaker voice and the interference voice uttered separately as the input voice 101, obtains a noise superimposition amount corresponding to the relation of the characteristic amounts of the speaker voice and the interference voice with reference to the superimposition amount storing unit (the matrix of FIG. 2), and can determine it as the noise superimposition amount for the input voice 101.

Referring to FIG. 2 as an example, in the case where the maximum power of the input voice 101 is 1500 and the maximum power of the leaked interference voice is 600 as the characteristic amounts obtained by the superimposition amount determining unit 14, the superimposition amount of white noise is 200. Concretely, the white noises are random numbers. The noise superimposing unit 16 generates a random number "r" ($-1<r<1$), generates noise by calculating P×r where P denotes the power of the superimposition amount determined by the superimposition amount determining unit 14, and superimposes the noise onto the input voice 101. In the case where the superimposition amount power is 200, white noise whose power is in the range of −200 to 200 is superimposed on the input voice 101. The random numbers "r" are normalized by the Box-Muller transform or the like, thereby enabling white noise having a more uniform frequency distribution to be generated.

As described above, in the voice recognizing unit 10 of the exemplary embodiment, on the precondition that a plurality of speakers speak at the same time, voice of an interference speaker leaked in the microphone is whitened in the range where the influence on recognition of the voice of the user speaker is small, and the influence on the voice recognition of the voice of the interference speaker can be reduced. Thus, the precision of voice recognition in the case where a plurality of utterances overlap can be improved.

By superimposing noise of proper power on the input voice 101, the voice of the interference speaker leaked in the microphone is whitened. Therefore, the possibility that an improper voice recognition result caused by leakage of the voice of the interference speaker to the microphone can be reduced.

Figure 14:
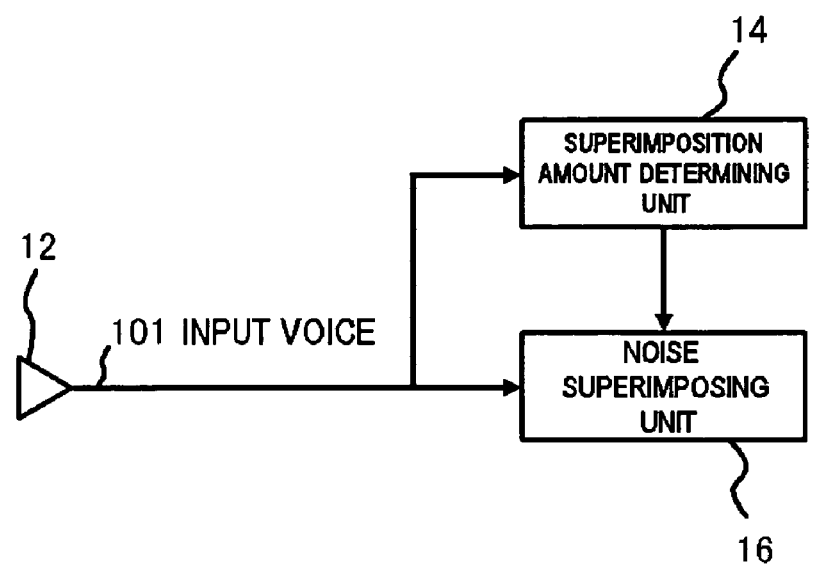
FIG. 14 is a functional block diagram showing the configuration of an interference reducing apparatus as an exemplary embodiment of the present invention.

The recognizing unit in the voice recognizing apparatus described above is not limited to a system of performing the voice recognizing process. For example, another configuration can be also employed such that the recognizing unit outputs only voice obtained by superimposing the reduction signal on the input voice. FIG. 14 shows the configuration. As shown in the diagram, the configuration is different from the voice recognizing apparatus of FIG. 1 with respect to the point that the voice recognizing unit 18 is not included.

The interference reducing apparatus includes: the superimposition amount determining unit 14, in the case of receiving a voice including an utterance voice uttered by a user speaker and an interference signal, on the basis of an interference component which interferes with recognition of the voice, obtaining a reduction signal of reducing the influence of the interference component in the recognition of the voice by superimposing the reduction signal onto the voice; and the reduction signal superimposing unit 16 for superimposing the reduction signal on the voice and outputting the superimposed voice.

In the configuration, the apparatus produces the effect that the user can easily distinguish target voice at the time of previewing to voice including interference signals.

Second Exemplary Embodiment

A voice recognizing apparatus as the present exemplary embodiment of the invention is different from the voice recognizing apparatus 10 of the above exemplary embodiment with respect to the point that first and second input voices are input to the superimposition amount determining unit by using two input devices, and a noise superimposition amount to the first input voice is determined on the basis of the two input voices.

Figure 3:
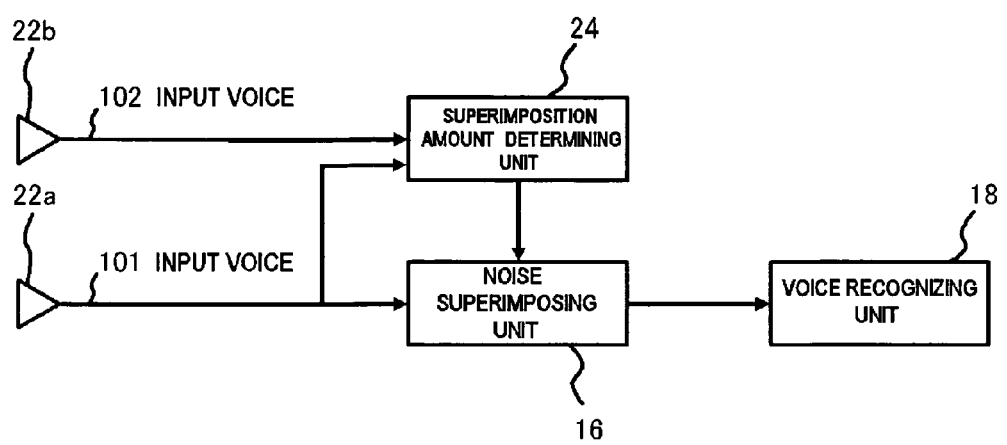
FIG. 3 is a functional block diagram showing the configuration of a voice recognizing apparatus according to another exemplary embodiment of the present invention.

FIG. 3 is a function block diagram showing the configuration of the voice recognizing apparatus as the present exemplary embodiment of the invention. A voice recognizing apparatus 20 of the present exemplary embodiment has an input unit (a first microphone 22a) to which is input the input voice 101 including speaker voice uttered by the user speaker and interference voice uttered by an interference speaker other than the user speaker, and a second input unit (a second microphone 22b) to which is input an input voice 102 different from the input unit (first microphone 22a). The speaker voice is received from the input unit (the first microphone 22a) and the interference voice is received from the second input unit (the second microphone 22b). Further, the voice recognizing apparatus 20 includes: a superimposition amount determining unit 24 for determining a noise superimposition amount for the input voice 101 on the basis of a speaker voice (input voice 101) and an interference voice (second input voice 102) input to the input unit (first microphone 22a) and the second input unit (second microphone 22b); the noise superimposing unit 16 for receiving only the input voice 101 input to the input unit (first microphone 22a), superimposing noise according to the noise superimposition amount, and outputting the resultant voice as noise-superimposed voice; and the voice recognizing unit 18 for recognizing the noise-superimposed voice.

Concretely, the voice recognizing apparatus 20 of the second exemplary embodiment includes the noise superimposing unit 16 and the voice recognizing unit 18 same as those of the voice recognizing apparatus 10 of the foregoing exemplary embodiment and, in addition, the superimposition amount determining unit 24. Since the noise superimposing unit 16 and the voice recognizing unit 18 are similar to those of the foregoing exemplary embodiment, the detailed description will not be repeated. The superimposition amount determining unit 24 is connected to the first and second microphones 22a and 22b, receives the first and second input voices 101 and 102, and determines the noise superimposition amount for the first input voice 101 on the basis of the first and second input voices 101 and 102 received.

Preferably, the second input voice 102 is input voice data for detecting interference voice, and the same input device as that for the first input voice 101 is used. By using the second input voice 102, the voice uttered by the user and the interference voice at the time of obtaining reference data can be dynamically discriminated from each other. Generally, by comparing the power of the first input voice 101 and that of the second input voice 102 with each other under the condition of the state where proper distance is maintained between the user speaker and the interference speaker, and there is no power difference between the voices of the user speaker and the interference speaker, the voice uttered by the user and the interference voice can be discriminated from each other. Specifically, when the first input voice 101 is louder, the voice can be regarded as the voice uttered by the user. When the second input voice 102 is louder, the voice can be regarded as the interference voice. It is considered that, by discriminating the utterance of the user and the interference voice from each other, an erroneous operation that utterance of the user is input by mistake at the time of input of the interference voice can be prevented.

The method of using the power difference of the input voices, however, has a problem. When on-line use is assumed, in the case where the uttered voice and the interference voice are simultaneously input and superimposed, the superimposition amount cannot be estimated correctly.

To address the problem, there is an effective method of using a detecting unit for determining the presence or absence of the uttered voice in the first input voice and a detecting unit for determining the presence or absence of the interference voice in the second input voice and, when one of the voices is detected, using the voice as a reference of the superimposition amount estimation. An example of the detecting unit is a method of using the power difference in the case where the uttered voice or the interference voice is input to the two microphones and determining voice detection thresholds using the powers of the uttered voice and the interference voice. The thresholds for the uttered voice and the interference voice are, respectively, set in consideration of the influence on voice recognition.

By using such detecting units, in the case where the voice is detected only in the first microphone, the reference of the power of the uttered voice can be obtained. In the case where the voice is detected only in the second microphone, the reference of the interference voice can be obtained.

Figure 13:
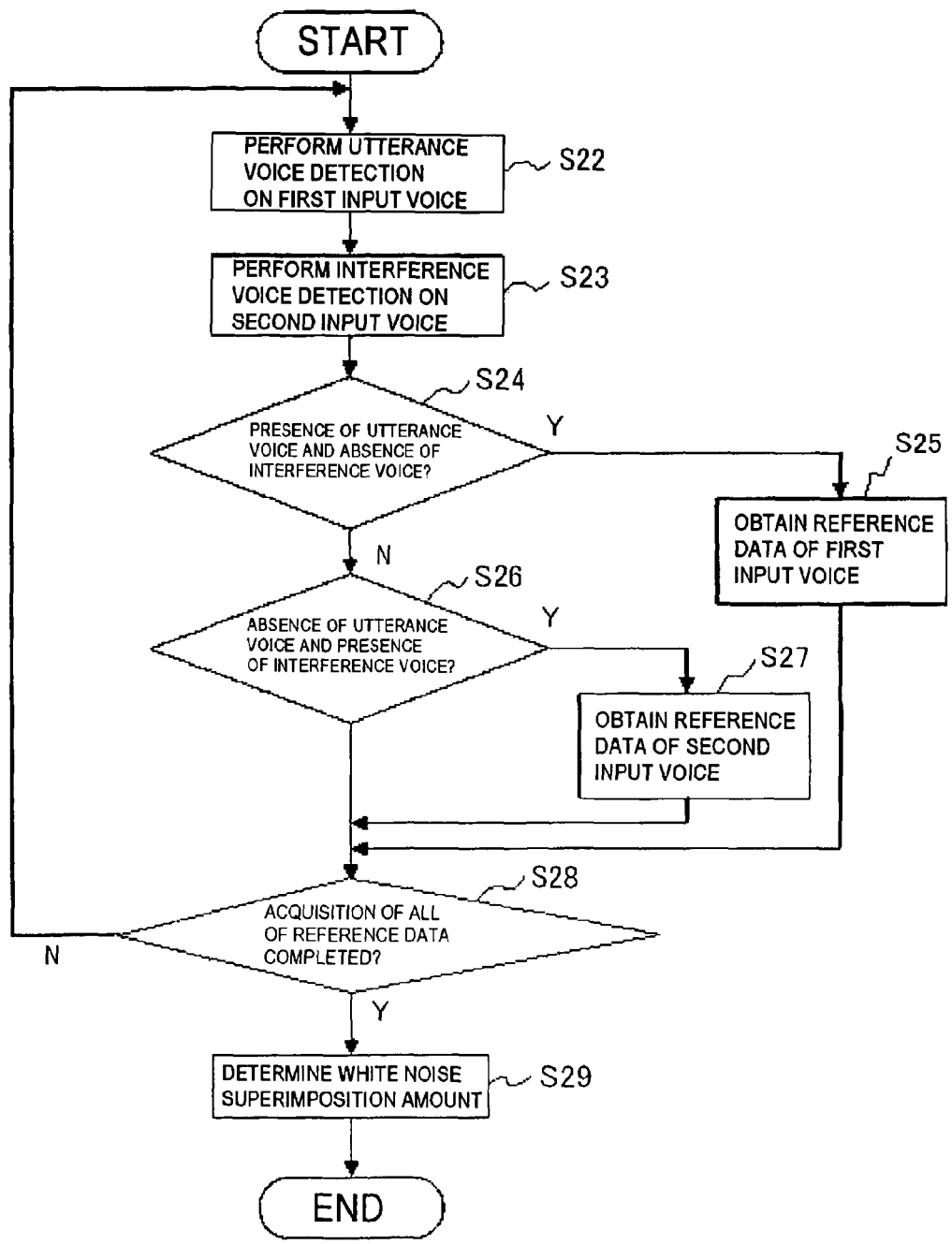
FIG. 13 is a flowchart showing an example of the operation at the time of a superimposing amount estimation in the voice recognizing apparatus of FIG. 3.

FIG. 13 is a flowchart of superimposition amount estimation in the superimposition amount determining unit 24 in the voice recognizing apparatus 20 of the present exemplary embodiment. First, utterance detection (S22) for the first input voice and interference voice detection (S23) for the second input voice are performed. In the case where both voice detection states are determined and only the uttered voice is detected (S24), the reference data for the first input voice is obtained (S25). In the case where only the interference voice is obtained (S26), the reference data for the second input voice is obtained (S27). When the reference data for both of the uttered voice and the interference voice is obtained (S28), the values of the reference data are collated with the matrix for superimposition amount estimation shown in FIG. 2, thereby obtaining the white noise superimposition amount (S29).

Although the method has a problem in a situation that the uttered voice and the interference voice are always output, it is effective in a situation that an interference signal is utterance of a human (for the reason that a silent interval tends to be created in the utterance of a human). In collation with the matrix of the superimposition amount estimation, by using an average value of reference data of a past few times, the precision of the superimposition amount estimation can be increased. The averaging is performed because variations are large in the power of the uttered voice by utterance or by uttered word.

As described above, in the voice recognizing unit 20 of the exemplary embodiment, on the precondition that a plurality of speakers speak at the same time, voice of an interference speaker leaked in the first microphone 22a is whitened in the range where the influence on recognition of the voice of the user speaker is small, and the influence on the voice recognition of the voice of the interference speaker can be reduced. Thus, the precision of voice recognition in the case where a plurality of utterances overlap can be improved.

By superimposing noise of proper power on the input voice 101, the voice of the interference speaker leaked in the first microphone 22a is whitened. Therefore, the possibility that an improper voice recognition result caused by leakage of the voice of the interference speaker to the first microphone 22a can be reduced.

Third Exemplary Embodiment

A voice recognizing apparatus as the present exemplary embodiment of the invention is different from the voice recognizing apparatuses of the foregoing exemplary embodiments with respect to the point that an input device of a plurality of channels is used to receive a plurality of voices, a plurality of noise superimposition amounts are determined for each of input voices of the plurality of channels and superimposed on the input voices of the plurality of channels, and the noise-superimposed voices of the plurality of channels are output.

Figure 4:
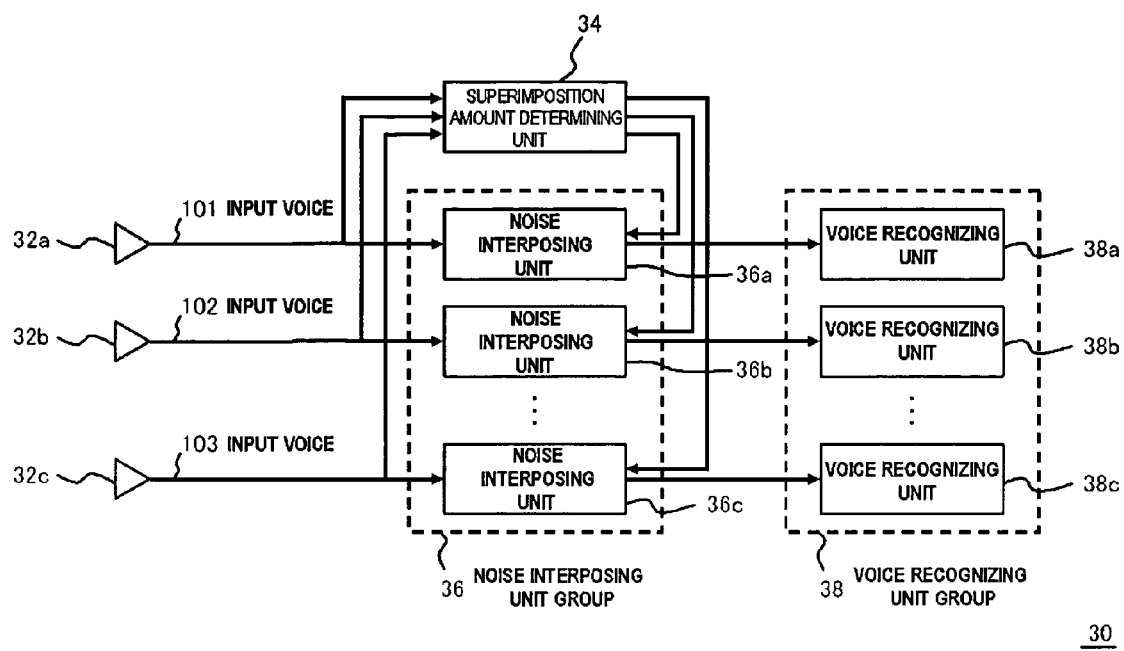
FIG. 4 is a functional block diagram showing the configuration of a voice recognizing apparatus according to another exemplary embodiment of the invention.

FIG. 4 is a function block diagram showing the configuration of the voice recognizing apparatus as the present exemplary embodiment. A voice recognizing apparatus 30 of the third exemplary embodiment includes: input units (a first microphone 32a, a second microphone 32b, and an n-th microphone 32c) to which input voices having a plurality of channels (input voices 101, 102, and 103) are input; a plurality of noise superimposition amount determining units 34 for determining a plurality of noise superimposition amounts for the plurality of channels (the input voices 101, 102, and 103) of the input voices, respectively, on the basis of the plurality of channels (input voices 101, 102, and 103) of the input voices; a plurality of noise superimposing units 36a, 36b, and 36c for superimposing a plurality of noises according to the plurality of noise superimposition amounts for the plurality of channels of the input voices (input voices 101, 102, and 103), respectively, by the plurality of corresponding channels of the input voices (input voices 101, 102, and 103), and outputting the plurality of noise-superimposed voices; and a plurality of voice recognizing units 38a, 38b, and 38c for recognizing the plurality of noise-superimposed voices, respectively.

Concretely, the voice recognizing apparatus 30 of the present exemplary embodiment includes: the first microphone 32a, the second microphone 32b, and the n-th microphone 32c (hereinbelow, in the case where they do not have to be distinguished from each other, they will be simply called "microphones 32"); the first noise superimposing unit 36a, the second noise superimposing unit 36b, and the n-th noise superimposing unit 36c (hereinbelow, in the case where they do not have to be distinguished from each other, they will be simply called "noise superimposing units 36") respectively connected to the microphones 32; the superimposition amount determining unit 34 connected to the plurality of microphones; and the first voice recognizing unit 38a, the second voice recognizing unit 38b, and the n-th voice recognizing unit 38c (hereinbelow, in the case where they do not have to be distinguished from each other, they will be simply called "voice recognizing units 38") respectively connected to the noise superimposing units 36. The plurality of noise superimposing units 36a, 36b, and 36c make up a noise superimposing unit group 36. The plurality of voice recognizing units 38a, 38b, and 38c make up the voice recognizing unit group 38.

As described above, the voice recognizing apparatus 30 of the exemplary embodiment is characterized in that the input voice have a plurality of voice input channels, and the apparatus 30 has the individual noise superimposing units and the individual voice recognizing units for the respective voice input channels.

The present exemplary embodiment relates to simultaneous uttered voice recognition for simultaneously recognizing voices uttered by a plurality of speakers in a single voice recognizing system. As the input voice, voice data input from the plurality of voice input channels is output on the respective channel units. For the input voices 101 to 103, the superimposition amount determining unit 34 determines the power of white noise to be superimposed from the power of voice uttered to the microphone 32 connected to the its own channel of itself and the power of leaked-in voice uttered to the microphones 32 connected to the other channels.

The white noise superimposition power determined by the superimposition amount determining unit 34 is calculated and stored channel by channel in accordance with the user speaker, the interference speaker, microphone sensitivity, and ambient environment. The noise superimposing units 36a, 36b, and 36c obtain the white noise superimposition powers corresponding to the input voices from the superimposition amount determining unit 34, superimpose the white noise superimposition powers on the input voices 101, 102, and 103, respectively, and output the resultant voices. The voice on which the white noise is superimposed as such operates so as to be recognized separately on the channel unit basis in the voice recognizing units 38a, 38b, and 38c.

In a manner similar to the first exemplary embodiment, the superimposition amount determining unit 34 needs accurate data on the powers of the uttered voices in each of the channels and voices leaked from the other channels. To obtain the data, preferably, each of the speakers makes an utterance test prior to execution of the simultaneous uttered voice recognition to collect reference data. The reference data is collected by making each of the speakers speak alone in a state where voice inputs of all of the channels start and obtaining the input voice power of each channel and the power of the interference uttered voice leaked in the other channels. Examples of the method of obtaining the reference data at the time of operation are a method of calling each of the speakers in the beginning and a method of interviewing or giving a quiz to each of the speakers.

The superimposition amount determining method is performed according to a matrix determined by an experiment in a manner similar to the first exemplary embodiment. A method can be applied in which data of the highest power among from leak-in voices in the respective microphones in the case where there are three or more speakers is used as the characteristic amount data of interference uttered voice.

As described above, in the voice recognizing unit 30 of the exemplary embodiment, on the precondition that a plurality of speakers speak at the same time, voice of an interference speaker leaked in the microphone is whitened in the range where the influence on recognition of the voice of the user speaker is small, and the influence on the voice recognition of the voice of the interference speaker can be reduced. Thus, the precision of voice recognition in the case where a plurality of utterances overlap can be improved.

By superimposing noise of proper power on the input voice, the voice of the interference speaker leaked in the microphone is whitened. Therefore, the possibility that an improper voice recognition result caused by leakage of the voice of the interference speaker to the microphone can be reduced.

Fourth Exemplary Embodiment

Figure 5:
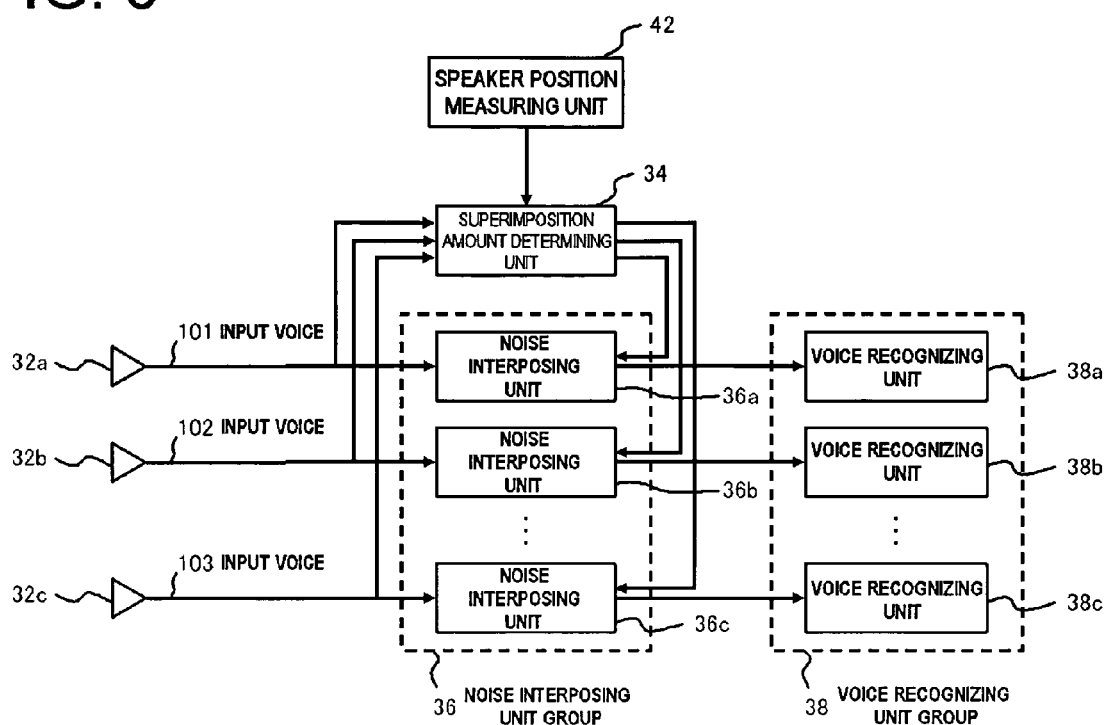
FIG. 5 is a functional block diagram showing the configuration of a voice recognizing apparatus according to another exemplary embodiment of the invention.

A voice recognizing apparatus as the present exemplary embodiment of the invention is different from the foregoing exemplary embodiments with respect to the point that a speaker position measuring unit for detecting the position of a speaker whose voice should be input is provided and a noise superimposition amount is determined in accordance with the speaker position. FIG. 5 is a functional block diagram showing the configuration of the voice recognizing apparatus of the present exemplary embodiment of the invention. A voice recognizing apparatus 40 of the present exemplary embodiment has constitutional elements similar to those of the voice recognizing apparatus 30 of the above exemplary embodiment and, in addition, a speaker position measuring unit 42 for detecting the position of the speaker whose voice should be input and outputting the detected position to the superimposition amount determining unit 34.

The speaker position measuring unit 42 is used to obtain the distance between speakers. An example of the speaker position measuring unit 42 may employ a unit for detecting the position of a speaker existing in the neighborhood, which supported by a system for performing voice recognition (for example, an interactive robot for supporting simultaneous uttered voice recognition) to perform face detection by image identification or tag identification using RFID (Radio Frequency Identification), ultrasonic wave, and infrared ray.

An example of an application method using speaker position data obtained by the speaker position measuring unit 42 will be described. First, in the speaker position measuring unit 42, the position of each speaker is obtained by a position obtaining unit (not shown) at the time of acquisition of reference data for determining a white noise superimposition amount. At each of the channels, the speaker position measuring unit 42 obtains the distance between the user speaker and an interference speaker used as reference data of the interference uttered voice and holds it as the distance to the interference speaker in a holding unit (not shown). The speaker position measuring unit 42 includes a monitoring unit (not shown) for monitoring the distance between the user speaker and the interference speaker at each of the channels during execution of the simultaneous uttered voice recognition. The monitoring unit detects approach more than the distance to the interference speaker held in the holding unit by a predetermined threshold or more. When the approach is detected, detection signal is output. The predetermined threshold is determined in advance by an experiment.

In response to the detection signal, in a system such as a robot, voice recognition of the voice recognizing unit 38 is stopped, and a warning alarm or message which informs that the distance between the user speaker and the interference speaker should be increased can be output. Alternatively, the superimposition amount of white noise can be increased in the superimposition amount determining unit 34.

As described above, in the voice recognizing apparatus 40 of the exemplary embodiment of the invention, the situation that the distance between the user speaker and the interference speaker is shortened is detected. A warning can be given to the speakers to increase the distance, or the superimposition amount can be controlled in the superimposition amount determining unit 34, so that the voice recognition is not influenced. Thus, the voice recognition precision can be improved.

Fifth Exemplary Embodiment

Figure 6:
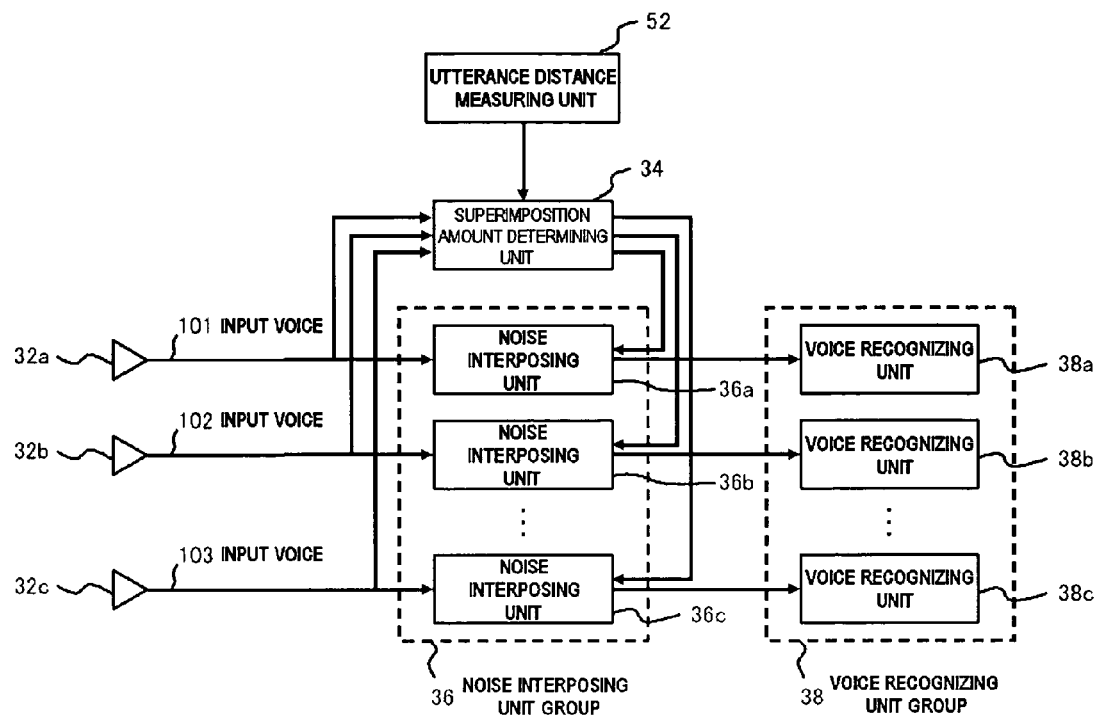
FIG. 6 is a functional block diagram showing the configuration of a voice recognizing apparatus according to another exemplary embodiment of the invention.

A voice recognizing apparatus as the present exemplary embodiment of the invention is different from the foregoing exemplary embodiments with respect to the point that an utterance distance measuring unit for measuring utterance distance between a speaker whose voice should be input and the input unit is provided and the noise superimposition amount is determined according to the utterance distance. FIG. 6 is a functional block diagram showing the configuration of the voice recognizing apparatus of the fifth exemplary embodiment of the invention. A voice recognizing apparatus 50 of the present exemplary embodiment has constitutional elements similar to those of the voice recognizing apparatus 30 of the present exemplary embodiment and, in addition, an utterance distance measuring unit 52 for measuring the utterance distance between the speaker whose voice should be input and the microphone 32 and outputting the measured distance to the superimposition amount determining unit 34.

The utterance distance measuring unit 52 measures the distance between the user speaker and the microphone 32 at each of the channels. One of the methods of measuring the distance between the user speaker and the microphone is a method of attaching a sensor capable of measuring the distance such as an ultrasonic sensor at the tip of the microphone 32. The intension of measuring the utterance distance is to prevent an adverse influence of white noise superimposition due to a change in the utterance distance during use of the simultaneous uttered voice recognition.

An example of the application method of the utterance distance measuring unit 52 will be described. First, in the utterance distance measuring unit 52, at the time of obtaining reference data for determining the white noise superimposition amount, the utterance distance of each speaker is obtained by an utterance distance obtaining unit (not shown). The utterance distance measuring unit 52 includes a monitoring unit (not shown) for monitoring the utterance distance of the user at each of the channels during execution of the simultaneous utterance voice recognition. The monitoring unit detects that the utterance distance has increased by a predetermined threshold or more as compared with that at the time of obtaining the reference data. When increase in the distance is detected, a detection signal is output. The predetermined threshold is preliminarily determined by experiments.

In response to the detection signal, in a system such as a robot, voice recognition of the voice recognizing unit 38 is stopped, and a warning alarm or message which informs that the utterance distance between speakers should be increased can be output. Alternatively, in the superimposition amount determining unit 34, the superimposition amount of white noise may be reduced or superimposition may be stopped.

As described above, in the voice recognizing apparatus 50 of the exemplary embodiment of the invention, the situation that the distance between the respective speaker and the microphone 32 is long is detected. A warning can be given to the speakers to decrease the utterance distance, or the superimposition amount can be controlled in the superimposition amount determining unit 34, so that the voice recognition is not influenced. Thus, the voice recognition precision can be improved.

The exemplary embodiments of the present invention have been described above with reference to the drawings. The exemplary embodiments are examples of the invention and various configurations other than the above can be also employed.

For example, the present invention can be used for a voice interactive system, an interactive robot control system, an information retrieval system, and the like. In particular, the invention can be effectively applied to a voice interactive system, an interactive robot control system, an information retrieval system, and the like on precondition that a plurality of speakers simultaneously speak during voice recognition.

EXAMPLES

First Example

Figure 7:
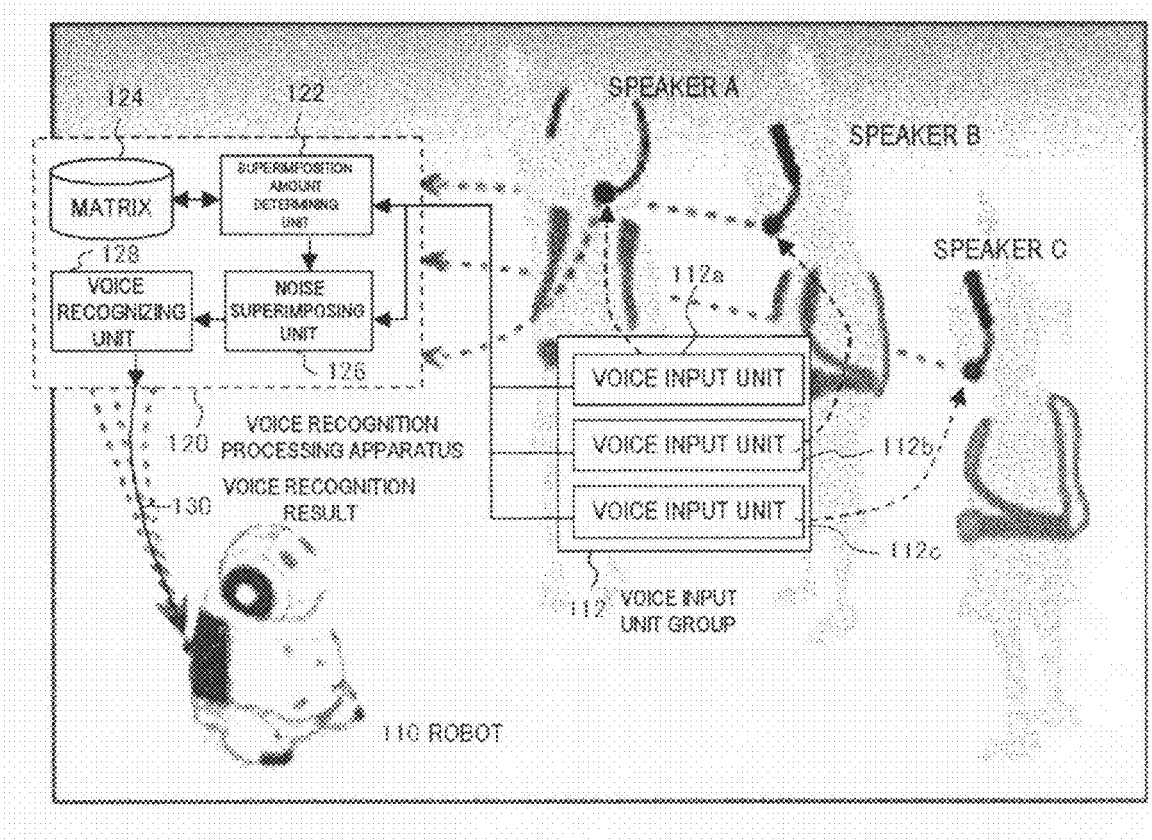
FIG. 7 is a functional block diagram showing the configuration of a voice recognition system of a robot as a first example of the present invention.

In a first example of the present invention, a robot interacts with a plurality of speakers using a quiz scenario. FIG. 7 is a configuration diagram of the example. In the example of FIG. 7, a robot 110 voice-interacts with three speakers A, B, and C simultaneously. The robot 110 can communicate with the speakers A, B, and C by voice and has the function of receiving a specific event and responding to it by voice. Examples of the event are as follows. When a specific part in a robot is touched, a touch sensor event appears. When a voice recognition result is obtained, a voice recognition event appears. When a sensor for sensing the outside satisfies a constant condition, a sensor event appears.

The speakers A, B, and C wear first, second, and third voice input units 112a, 112b, and 112c, respectively, each using a headset microphone (hereinbelow, when they do not have to be distinguished from each other, they will be simply called "voice input unit 112") and speak to the robot 110. The three voice input units 112a, 112b, and 112c make up the voice input unit group 112. The voices input from the respective voice input units 112 are input to a voice recognition processing apparatus 120 including a superimposition amount determining unit 122, a matrix storing unit 124 (shown as "matrix" in the drawings), a noise superimposing unit 126, and a voice recognizing unit 128. A voice recognition result 130 is sent back to the robot 110.

The voice recognition processing apparatus 120 is connected to the robot 110 via a network such as a wireless LAN and can send the voice recognition result 130 back to the robot 110 via the network. The voice recognition result 130 includes the recognition result and a speaker ID indicating the voice input unit 112 from which the recognition result is received.

The voice recognition processing apparatus 120 is positioned as an external apparatus different from the robot 110 in the example of FIG. 7. When the robot 110 has sufficient capability, the robot 110 may execute the process performed by the voice recognition processing apparatus 120. The robot 110 receives the voice recognition result 130 sent back from the voice recognition processing apparatus 120 and reacts according to the result. For example, in the case where the voice recognition result 130 has the speaker ID corresponding to the first voice input unit 112a and the voice recognition result is "hello", the robot 110 utters and replies "Hello, A" to the speaker A who holds the first voice input unit 112a.

Figure 8:
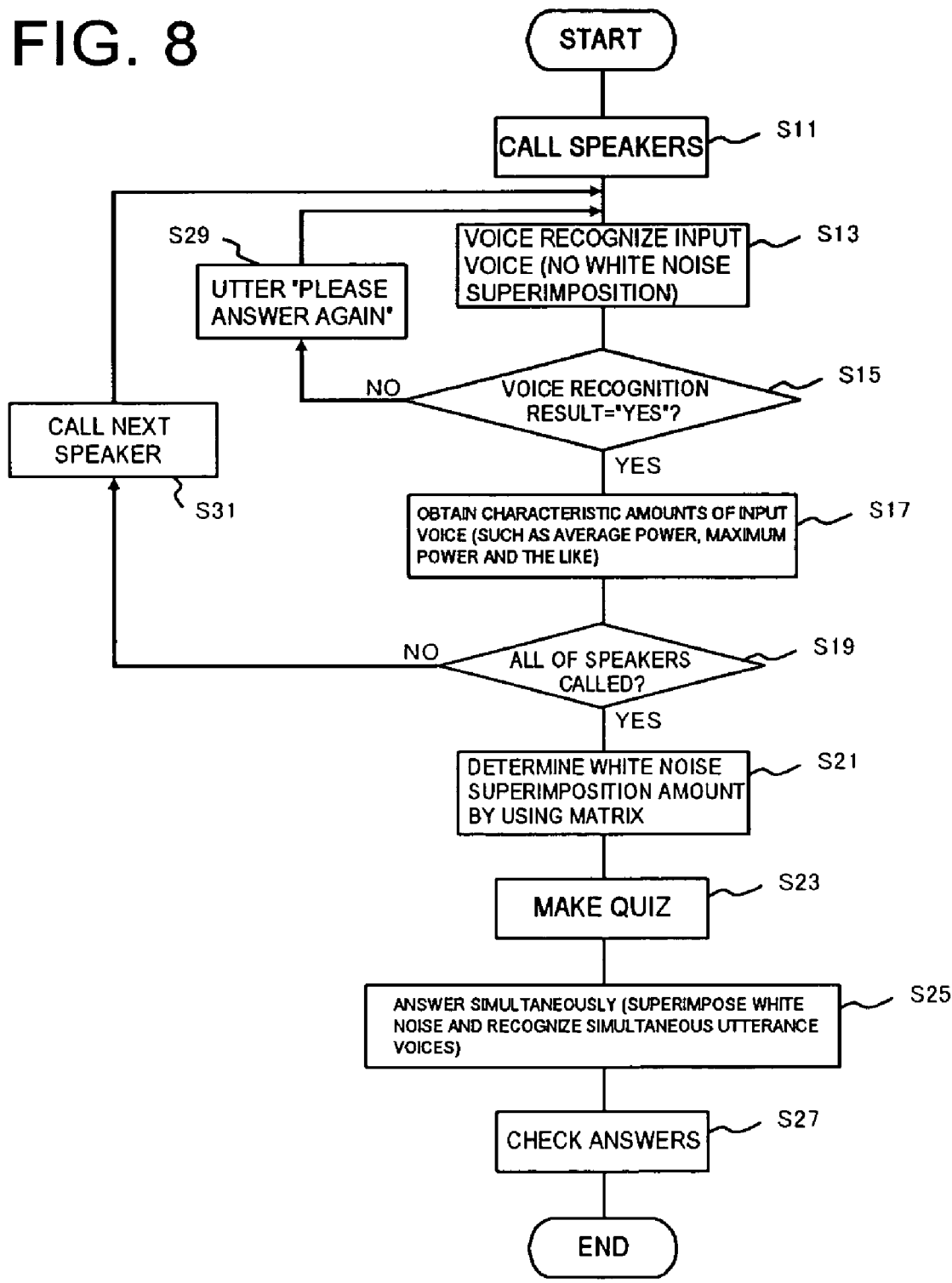
FIG. 8 is a flowchart showing an example of the operation of the voice recognition system of FIG. 7.

The example of the quiz scenario will be described using the flowchart shown in FIG. 8. In the following description, FIG. 7 is also used. First, the robot 110 calls the speakers one by one before making a quiz (S11). When a speaker answers the call, the answer is input via the voice input unit 112 and the voice is recognized by the voice recognition processing apparatus 120 (S13).

The voice recognition result 130 is transmitted to the robot 110, and the robot 110 executes an operation based on the voice recognition result 130. In the case where the voice recognition result 130 is not "yes" (or any other correct answer recognition words) (NO in S15), the robot 110 encourages the speaker to utter a word again (S29). In this case, the robot 110 utters "please answer again". In the case where the voice recognition result is "yes" (or any other correct answer recognition words) (YES in S15), the voice recognition processing apparatus 120 obtains the characteristic amounts such as the maximum power and the average power of the input voice speaker by speaker (S17). Until roll call of all of the speakers is finished (NO in S19), the robot 110 repeats the roll call (S31).

When the roll call of all of the speakers is finished (YES in S19), the superimposition amount determining unit 122 determines a white noise superimposition amount for each of the voice input units 112 of the speakers by using the matrix in the matrix storing unit 124 (S21). After the white noise superimposition amount is determined, the robot 110 makes a quiz (S23), and the speakers A, B, and C simultaneously start answering to the quiz made by the robot 110 (S25). When all of them answer or pass the time limit, the voice recognition processing apparatus 120 finishes the simultaneous uttered voice recognition and the robot 110 checks the answers in accordance with the voice recognition results 130 (S27).

The roll call in step S11 may be replaced with a method of making a preparatory question to each of the speakers and making the speakers answer to the questions. It is not essential to recognize the voices obtained in the roll call. It is however considered that, by making the voice recognition, familiarization to the voice recognition of the users may be promoted and, by using voices uttered in a form adapted to the voice recognition, precision of reference data can be increased. By preliminarily determining the white noise superimposition amount by using a sufficient amount of samples of the user speaker and the interference speaker in advance, the processes in steps S11 to S21 may be omitted.

Second Example

Figure 9:
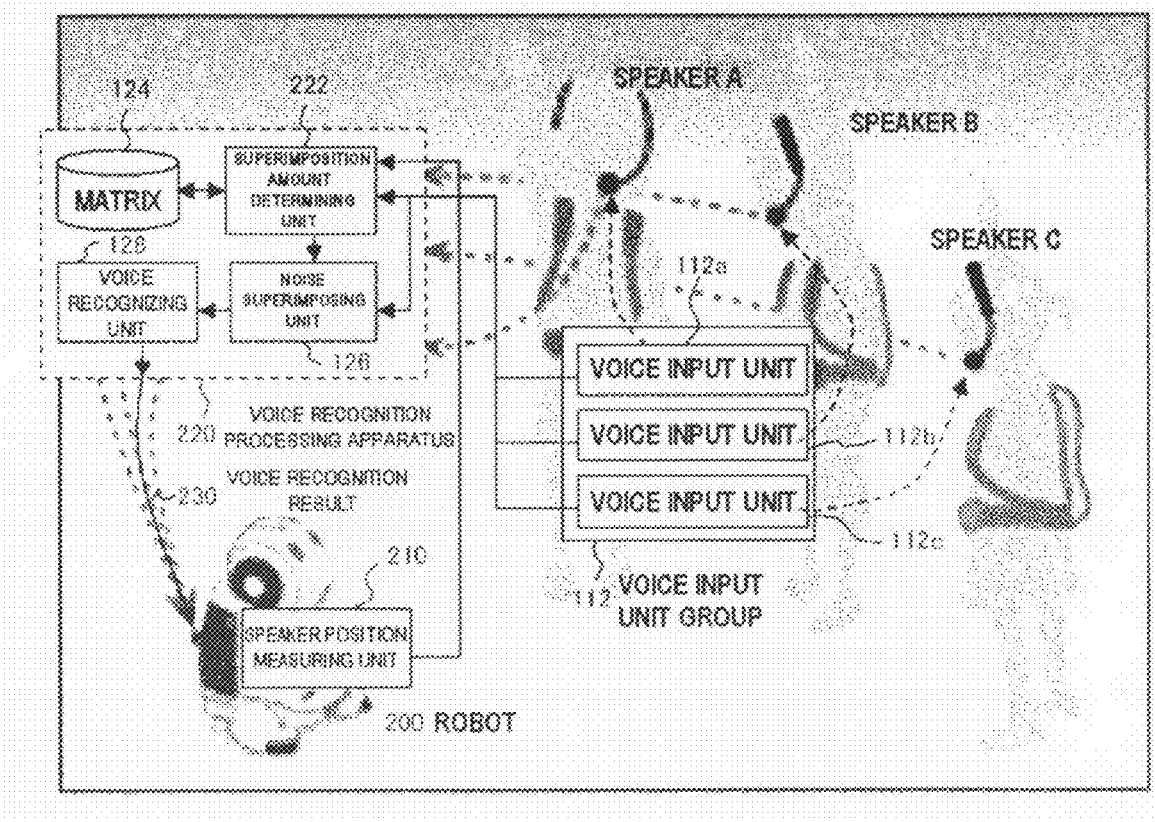
FIG. 9 is a functional block diagram showing the configuration of a voice recognition system of a robot as a second example of the invention.

Next, as a second example of the present invention, the case where a robot 200 has a speaker position measuring unit 210 in addition to the configuration of the first example, and a measurement result is input to a superimposition amount determining unit 222 of a voice recognition processing unit 220 will be described. FIG. 9 is a configuration diagram of the second example. The robot 200 detects the positions of the speakers A, B, and C and calculates the distances between the speakers with each other. The distances between the speakers are calculated every constant time or in response to a request from an external component. For example, when the distance to the speaker A is set as "a", the distance to the speaker B is set as "b", and the angle difference of the azimuths of the speakers A and B (the narrow angle of the triangle) is set as q, the distances between the speakers can be derived by a general trigonometric function. The distance between the speakers A and B in this example can be calculated by the following equation (1).

$$\sqrt{a^2+b^2-2ab\cos\theta} \qquad \text{Equation (1)}$$

In the voice recognition processing unit 220, the superimposition amount determining unit 222 holds a matrix for determining the superimposition amounts shown in FIG. 2 in the matrix storing unit 124 by target distances (for example, a matrix for inter-speaker distance of 50 cm, a matrix for inter-speaker distance of 1 m, and the like). The matrixes by inter-speaker distances may be obtained by a method of conducting experiments by target distances to determine matrixes, and using a matrix selected the approximate one of inter-speaker distances. Another method may be also employed in which a matrix for a specific target distance is generated and, then by using the fact that the voice power is inversely proportional to the square of the distance, a matrix by distance is converted (for example, integration with the square of the distance ratio).

Figure 10:
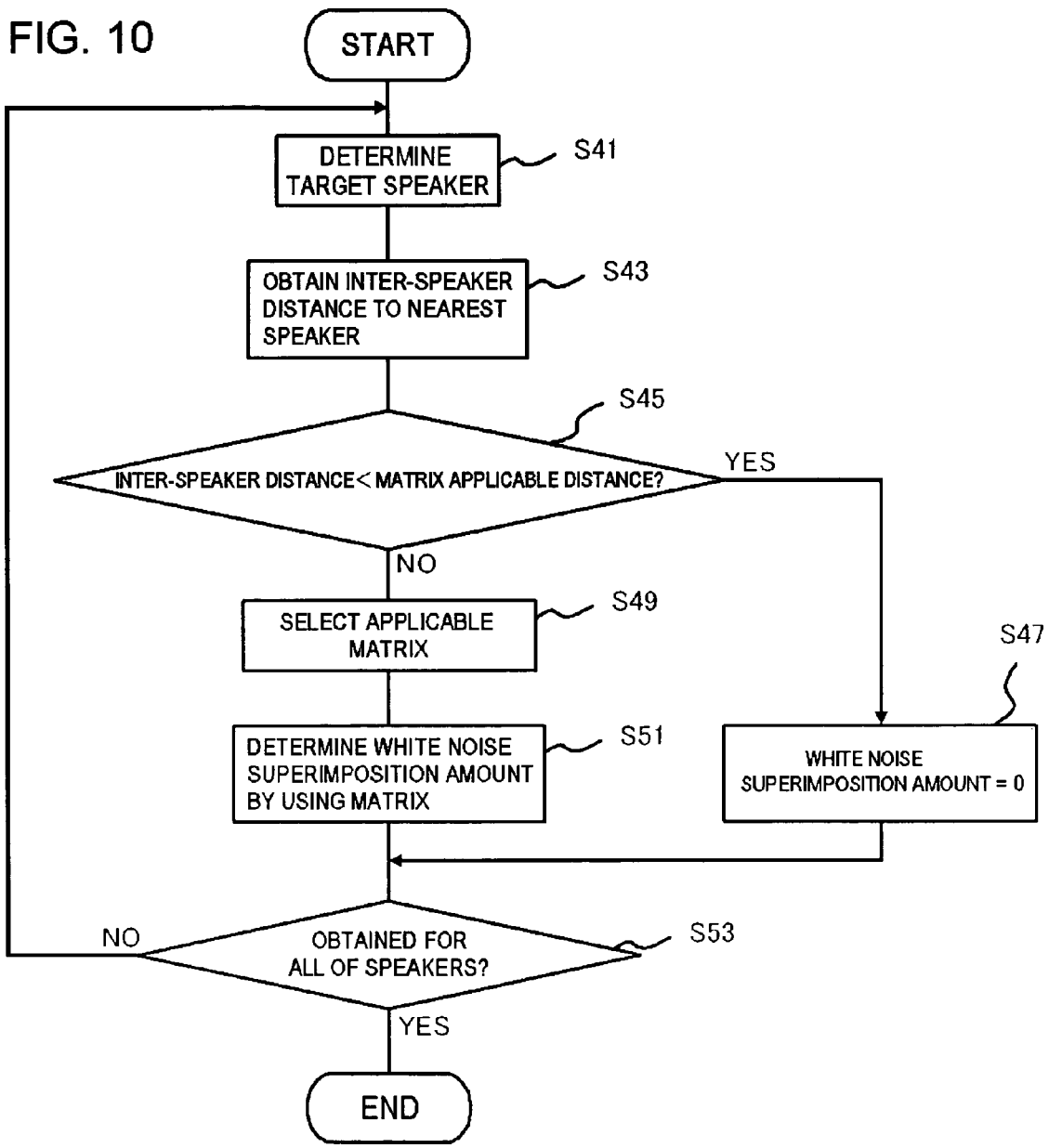
FIG. 10 is a flowchart showing an example of operation of the voice recognition system of FIG. 9.

The operations of the superimposition amount determining unit 222 in the second example of the present invention will be described by using the flowchart shown in FIG. 10. In the following description, FIG. 9 is also used. In the example of FIG. 10, the distance to which a matrix can be applied is used as a threshold, and the respective distance between speakers is compared with the threshold. When the distance between speakers is less than the threshold, it is determined that there is no effect of noise superimposition, and the superimposition amount determining unit 222 stops superimposition of white noise. When the distance between speakers is equal to or larger than the threshold, a matrix according to the distance to the speaker nearest to the target speaker is selected and used for determining the superimposition amount.

First, the robot 110 determines a target speaker whose voice should be superimposed with white noise (S41) and obtains the shortest inter-speaker distance to the speaker nearest to the target speaker on the basis of an inter-speaker distance obtained from the speaker position measuring unit 210 (S43).

Next, the speaker position measuring unit 210 determines whether or not the shortest inter-speaker distance is less than the threshold of the matrix applicable distances (S45) and notifies the superimposition amount determining unit 222 of the result. In the case where the shortest inter-speaker distance is less than the threshold of the matrix applicable distances (YES in S45), the superimposition amount determining unit 222 sends back the superimposition amount of zero (S47). In the case where the shortest inter-speaker distance is equal to or larger than the threshold (NO in S45), the superimposition amount determining unit 222 selects a matrix according to the shortest inter-speaker distance from the matrix storing unit 124 (S49). The superimposition amount determining unit 222 determines a white noise superimposition amount by using the matrix selected from the matrix storing unit 124 (S51). The white noise superimposition amount determining operation is repeatedly performed on all of the speakers as target speakers (S53).

In the case where the shortest inter-speaker distance is less than the threshold of the matrix applicable distances, preferably, the speaker position measuring unit 210 may detect that the inter-speaker distance is insufficient and feeds back the fact to the robot 200. The robot 200 then may perform an operation of giving the user a warning that the user is too close to the other speakers, such as an operation of uttering words "Be away from the others by some distance." or the like. The noise superimposing unit 126 superimposes the noise superimposition amount determined in such a manner on the input voice, and a voice recognition result 230 of voice recognition performed by the voice recognizing unit 128 is transmitted to the robot 200.

Third Example

Figure 11:
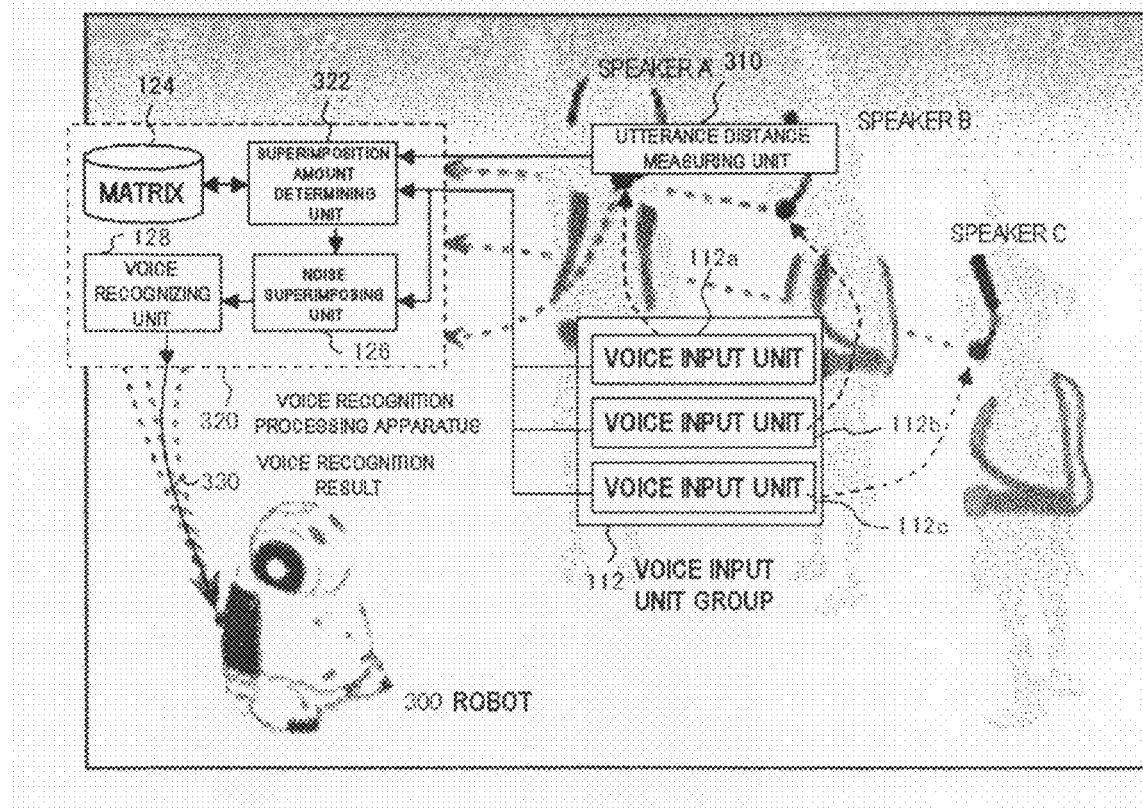
FIG. 11 is a functional block diagram showing the configuration of a voice recognition system of a robot as a third example of the invention.

Next, as a third example of the present invention, the case where, in addition to the configuration of the first example, the voice input device 112 which is put on the speaker has an utterance distance measuring unit 310, and a measurement result is input to a superimposition amount determining unit 322 of a voice recognition processing unit 320 will be described with reference to FIG. 11. The utterance distance measuring unit 310 obtains the distance between the voice input unit 112 and the mouth of the speaker by an ultrasonic sensor or the like and inputs the distance to the superimposition amount determining unit 322. The utterance distance measuring unit 310 may be included as a part of the functions of the voice input unit 112. That is, the voice input unit 112 may obtain information of the utterance distance and attach it to utterance voice data at the time of transmitting utterance voice data of the user. In a manner similar to the second example, the superimposition amount determining unit 322 stores a matrix for determining the superimposition amount into the matrix storing unit 124 by utterance distances. The matrix is generated by an experiment for each of the target distances or obtained by converting a matrix obtained by an experiment for a specific target distance.

Figure 12:
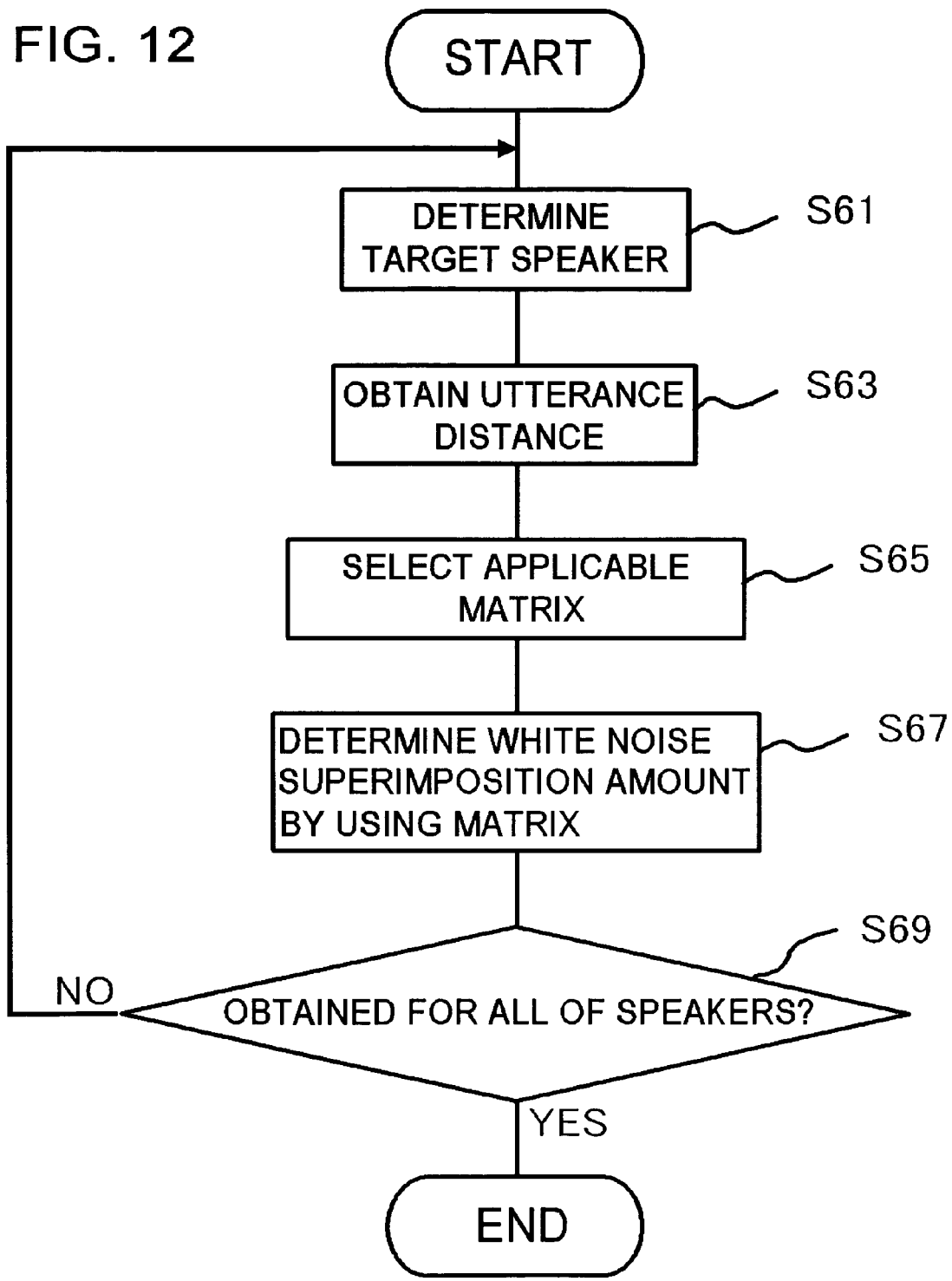
FIG. 12 is a flowchart showing an example of the operation of the voice recognition system of FIG. 11.

The operations of the superimposition amount determining unit 322 in the third example of the present invention will be described by using the flowchart shown in FIG. 12. In the following description, FIG. 11 is also used. First, a robot 300 determines the target speaker whose voice should be superimposed with white noise (S61) and obtains a measurement result of the utterance distance from the utterance distance measuring unit 310 (S63). The robot 300 selects a matrix according to the utterance distance from the matrix storing unit 124 (S65) and, by using the selected matrix, determines the white noise superimposition amount (S67). The operations are repeatedly executed on all of the speakers (S69).

In the case where the utterance distance is equal to or longer than a predetermined threshold, preferably, the utterance distance measuring unit 310 detects that the utterance distance is too long and feeds back the fact to the robot 300. The robot 300 performs an operation of giving the user a warning to speak closer to the voice input unit 112, such as an operation of uttering words "Be closer to the microphone." or the like. The noise superimposing unit 126 superimposes the noise superimposition amount determined in such a manner on the input voice, and a voice recognition result 330 of voice recognition performed by the voice recognizing unit 128 is transmitted to the robot 300.

The configurations of the present invention have been described above. The invention includes the following exemplary aspects.

(1) The present invention provides a voice recognizing apparatus including: an input unit which inputs input voice including speaker voice uttered by a user speaker and interference voice uttered by an interference speaker other than the user speaker; a superimposition amount determining unit which determines a noise superimposition amount for the input voice on the basis of the speaker voice and the interference voice separately received as the input voice; a noise superimposing unit which superimposes noise according to the noise superimposition amount onto the input voice and outputs the resultant voice as noise-superimposed voice; and a voice recognizing unit which recognizes the noise-superimposed voice.

(2) The voice recognizing apparatus described in the above (1) may include a superposition amount storing unit which previously stores an optimum noise superimposition amount associated with the relation of characteristic amounts of the speaker voice uttered by the user speaker and the interference voice uttered by the interference speaker. The superimposition amount determining unit may obtain the respective characteristic amounts of the speaker voice and the interference voice uttered separately as the input voices, obtain a noise superimposition amount corresponding to the relation of the characteristic amounts of the speaker voice and the interference voice with reference to the superimposition amount storing unit, and determine it as a noise superimposition amount for the input voices.

(3) The voice recognizing apparatus described in the above (3) may further include a second input unit which inputs a second input voice, which is different from the input unit. The speaker voice is input from the input unit, and the interference voice is input from the second input unit. The superimposition amount determining unit may determine a noise superimposition amount for the input voice on the basis of the speaker voice and the interference voice input to the input unit and the second input unit. The noise superimposing unit may receive only the input voice input to the input unit, superimposes the noise according to the noise superimposition amount on it, and outputs the resultant voice as the noise-superimposed voice.

(4) The voice recognizing apparatus described in the above (3) may include a superimposition amount storing unit which previously stores an optimum noise superimposition amount associated with the relation of characteristic amounts of the speaker voice uttered by the user speaker and the interference voice uttered by the interference speaker. The superimposition amount determining unit may obtain the respective characteristic amounts of the speaker voice and the interference voice, obtain a noise superimposition amount corresponding to the relation of the characteristic amounts of the speaker voice and the interference voice with reference to the superimposition amount storing unit, and determine it as a noise superimposition amount for the input voices.

(5) The voice recognizing apparatus described in the above (1) may include: a plurality of superimposition amount determining units which determines a plurality of noise superimposition amounts for a plurality of channels of the input voice which is input to the input unit on the basis of the plurality of channels of the input voice; a plurality of noise superimposing units which superimposes a plurality of noises according to the plurality of noise superimposition amounts onto the plurality of corresponding channels in the input voice and outputs the plurality of noise-superimposed voices; and a plurality of voice recognizing units which recognizes the plurality of noise-superimposed voices.

(6) The voice recognizing apparatus described in the above (5) may have a superposition amount storing unit which previously stores an optimum noise superimposition amount associated with the relation of characteristic amounts of the speaker voice uttered by the user speaker and the interference voice uttered by the interference speaker. The plurality of superimposition amount determining units may obtain, for each channel of the input voice, the characteristic amount of the input voice of one of the plurality of channels of the input voice as the speaker voice and the characteristic amount of the input voice in the other channels as the interference voice, obtain a plurality of noise superimposition amounts corresponding to the relation of the characteristic amounts of the speaker voice and the interference voice with reference to the superimposition amount storing unit, and determine them as a plurality of noise superimposition amounts for the plurality of corresponding channels of the input voice.

(7) The above described voice recognizing apparatus may further include a speaker position measuring unit which detects a position of a speaker whose voice should be input, and outputs the position to the superimposition amount determining unit. The superimposition amount determining unit may determine the noise superimposition amount in accordance with the position of the speaker obtained from the speaker position measuring unit.

(8) The above described voice recognizing apparatus may further include an utterance distance measuring unit which measures an utterance distance between a speaker whose voice should be input and the input unit and outputs it to the superimposition amount determining unit. The superimposition amount determining unit may determine a noise superimposition amount in accordance with the utterance distance obtained from the utterance distance measuring unit.

(9) In the above described voice recognizing apparatus, the noise may be white noise.

(10) According to the present invention, there is provided an interactive robot including the above described voice recognizing apparatus, and the robot executes speech and behavior according to a voice recognition result output from the voice recognizing unit.

(11) According to the present invention, there is provided an interactive robot connected to a server which performs a voice recognizing process via a network, wherein the server includes the voice recognizing apparatus according to any of claims 1 to 9 and outputs a voice recognition result output from the voice recognizing unit to the robot via the network.

(12) According to the present invention, there is provided a voice recognizing method including: receiving an input voice including a speaker voice uttered by a user speaker and an interference voice uttered by an interference speaker other than the user speaker; determining a noise superimposition amount for the input, voice on the basis of the speaker voice and the interference voice which are input separately as the input voice; superimposing noise according to the noise superimposition amount onto the input voice; outputting the resultant as a noise-superimposed noise; and recognizing the noise-superimposed voice.

(13) The voice recognizing method described in the above (12) may further include: preparing a superimposition amount storing unit which previously stores an optimum noise superimposition amount associated with the relation of characteristic amounts of the speaker voice uttered by the user speaker and the interference voice uttered by the interference speaker; obtaining the characteristic amounts of the speaker voice and the interference voice uttered separately as the input voices; obtaining a noise superimposition amount corresponding to the relation of the characteristic amounts of the speaker voice and the interference voice with reference to the superimposition amount storing unit; and determining it as a noise superimposition amount for the input voice.

(14) The voice recognizing method described in the above (12) may further include: receiving a speaker voice as an input voice; receiving an interference voice as a second input voice different from the input voice; determining a noise superimposition amount for the input voice on the basis of the speaker voice and the interference voice; superimposing noise according to the noise superimposition amount only on the input voice received; and outputting the resultant as a noise-superimposed voice.

(15) The voice recognizing method described in the above (14) may further include: preparing a superimposition amount storing unit which previously stores an optimum noise superimposition amount associated with the relation of characteristic amounts of the speaker voice uttered by the user speaker and the interference voice uttered by the interference speaker; obtaining the respective characteristic amounts of the speaker voice and the interference voice; obtaining a noise superimposition amount corresponding to the relation of the characteristic amounts of the speaker voice and the interference voice with reference to the superimposition amount storing unit; and determining it as a noise superimposition amount for the input voice.

(16) In the voice recognizing method described in the above (12), an input voice may have a plurality of channels. The method may further include: determining a plurality of noise superimposition amounts for the plurality of channels of the input voice on the basis of the plurality of channels of the input voice; superimposing a plurality of noises according to the plurality of noise superimposition amounts for the plurality of channels of the input voice by the plurality of corresponding channels of the input voice; outputting them as a plurality of noise-superimposed voices; and recognizing each of the plurality of noise-superimposed voices.

(17) The voice recognizing method described in the above (16) may further include: preparing a superimposition amount storing unit which previously stores an optimum noise superimposition amount associated with the relation of characteristic amounts of the speaker voice uttered by the user speaker and the interference voice uttered by the interference speaker; obtaining, for each of the plurality of channels of the input voice, the characteristic amounts of an input voice of one of a plurality of channels of the input voice as a speaker voice and an input voice of each of the other channels as an interference voice; obtaining a plurality of noise superimposition amounts corresponding to the relation of the characteristic amounts of the speaker voice and the interference voice with reference to the superimposition amount storing unit; and determining the amounts as a plurality of noise superimposition amounts for the plurality of channels of the input voice, respectively.

(18) The above described voice recognizing method may further include: detecting and outputting a position of a speaker whose voice should be input; and determining the noise superimposition amount in accordance with the position of the speaker.

(19) The above described voice recognizing method may further include: measuring and outputting an utterance distance between the position of the speaker whose voice should be input and a voice input position; and determining the noise superimposition amount in accordance with the utterance distance.

(20) In the above described voice recognizing method, the noise may be white noise.

(21) According to the present invention, there is provided a voice recognizing program which makes a computer function as: a unit which receives an input voice including a speaker voice uttered by a user speaker and an interference voice uttered by an interference speaker other than the user speaker; a unit which determines a noise superimposition amount for the input voice on the basis of the speaker voice and the interference voice which are input separately as the input voice; a unit which superimposes noise according to the noise superimposition amount onto the input voice and outputs the resultant as a noise-superimposed noise; and a unit which recognizes the noise-superimposed voice.

(22) In the voice recognizing program described in the above (21), the computer may further include a superimposition amount storing unit which previously stores an optimum noise superimposition amount associated with the relation of characteristic amounts of the speaker voice uttered by the user speaker and the interference voice uttered by the interference speaker. The unit which determines the noise superimposition amount may obtain the respective characteristic amounts of the speaker voice and the interference voice uttered separately as the input voices, obtain a noise superimposition amount corresponding to the relation of the characteristic amounts of the speaker voice and the interference voice with reference to the superimposition amount storing unit, and determine it as a noise superimposition amount for the input voice.

(23) In the voice recognizing program described in the above (21), the computer may be further made function as a unit which receives a second input voice different from the input voice. The unit which determines a noise superimposition amount may determine a noise superimposition amount for the input voice on the basis of the input voice and the second input voice input to a unit which receives an input voice and the unit which receives the second input voice. The unit which outputs the noise superimposition voice may superimpose noise according to the noise superimposition amount only on the input voice input to the input unit, and output the resultant as a noise-superimposed voice.

(24) In the voice recognizing program described in the above (23), the second input voice may include only an interference voice. The computer may further include a superimposition amount storing unit which previously stores an optimum noise superimposition amount associated with the relation of characteristic amounts of the speaker voice uttered by the user speaker and the interference voice uttered by the interference speaker. The unit which determines a noise superimposition amount may obtain the respective characteristic amounts of the speaker voice and the interference voice separately uttered from the input voice and the second input voice, obtain a noise superimposition amount corresponding to the relation of the characteristic amounts of the speaker voice and the interference voice with reference to the superimposition amount storing unit, and determines it as a noise superimposition amount for the input voice.

(25) In the voice recognizing program described in the above (21), an input voice may have a plurality of channels. The computer may be further made function as: a unit which determines a plurality of noise superimposition amounts for the plurality of channels of the input voice on the basis of the plurality of channels of the input voice; a unit which superimposes a plurality of noises according to the plurality of noise superimposition amounts for the plurality of channels of the input voice by the plurality of corresponding channels of the input voice and outputs them as a plurality of noise-superimposed voices; and a unit which recognizes each of the plurality of noise-superimposed voices.

(26) In the voice recognizing program described in the above (25), the computer may further include: a superimposition amount storing unit which previously stores an optimum noise superimposition amount associated with the relation of characteristic amounts of the speaker voice uttered by the user speaker and the interference voice uttered by the interference speaker. The unit which determines the noise superimposition amount may obtain, for each of the plurality of channels of the input voice, the characteristic amounts of an input voice of one of a plurality of channels of the input voice as a speaker voice and an input voice of the other channels as an interference voice, obtain a plurality of noise superimposition amounts corresponding to the relation of the characteristic amounts of the speaker voice and the interference voice with reference to the superimposition amount storing unit, and determine the amounts as a plurality of noise superimposition amounts for the plurality of channels of the input voice.

(27) In the above described voice recognizing program, the computer may be further made function as a unit which detects and outputs a position of a speaker whose voice should be input. The unit which determines a noise superimposition amount may determine the noise superimposition amount in accordance with the position of the speaker obtained from the unit which outputs the position of the speaker.

(28) In the above described voice recognizing program, the computer may be further made function as a unit which measures and outputs an utterance distance between the position of the speaker whose voice should be input and a voice input position. The unit which determines a noise superimposition amount may determine a noise superimposition amount in accordance with the utterance distance obtained from the unit which outputs the utterance distance.

(29) In the above described voice recognizing program, the noise may be white noise.

The invention claimed is:

1. An interference reducing apparatus comprising:
a superimposition amount determining unit, in the case of receiving a voice including an utterance voice uttered by a user speaker and an interference signal, which estimates an interference component that interferes with recognition of said voice from information based on a position of a speaker or an utterance distance, and obtains a reduction signal of reducing influence of said interference component in said recognition of said voice by superimposing said reduction signal onto said voice; and a reduction signal superimposing unit which superimposes said reduction signal on said voice and output the superimposed voice.

2. The interference reducing apparatus as set forth in claim 1, further comprising a speaker position measuring unit which detects a position of a speaker whose voice should be input and outputs the position to said superimposition amount determining unit, wherein said superimposition amount determining unit determines said reduction signal by using a distance between a user speaker obtained from said speaker position and an interference speaker as information based on the position of said speaker.

3. The interference reducing apparatus as set forth in claim 1, further comprising an utterance distance measuring unit which measures an utterance distance between a speaker whose voice should be input and said receiving unit and outputs the obtained utterance distance to said superimposition amount determining unit, wherein said superimposition amount determining unit determines said reduction signal by using said utterance distance as information based on the utterance distance of said speaker.

4. The interference reducing apparatus as set forth in claim 1, wherein said reduction signal is white noise.

5. The interference reducing apparatus as set forth in claim 1, further comprising a voice recognizing unit which performs a voice recognizing process on said superimposed voice.

6. A voice recognizing apparatus including the interference reducing apparatus as set forth in claim 1, wherein an input voice has a plurality of channels, and the voice recognizing apparatus comprises:

a plurality of superimposition amount determining units which determine a plurality of noise superimposition amount for said plurality of channels of said input voice, respectively, on the basis of said plurality of channels of said input voice;

a plurality of noise superimposing units which superimpose a plurality of noises according to said plurality of noise superimposition amounts for said plurality of channels of said input voice by said plurality of corresponding channels of said input voice, and output a plurality of noise-superimposed voices; and a plurality of voice recognizing units which recognize said plurality of noise-superimposed voices, respectively.

7. A voice recognizing apparatus as set forth in claim 6, further comprising a superimposition amount storing unit which previously stores an optimum noise superimposition amount associated with a relation of characteristic amounts of said utterance voice uttered by said user speaker and said interference signal, wherein said plurality of superimposition amount determining units obtain, for each of said plurality of channels of said input voice, said respective characteristic amounts of an input voice of one of said plurality of channels as said utterance voice and input voices of the other channels as said interference signals, obtain said plurality of noise superimposition amounts corresponding to said relation of said characteristic amounts of said utterance voice and said interference signals with reference to said superimposition amount storing unit, and determine them as a plurality of noise superimposition amounts for said plurality of channels of said input voice, respectively.

8. An interactive robot comprising the voice recognizing apparatus as set forth in claim 5, wherein said robot executes speech and behavior according to a voice recognition result output from said voice recognizing unit.

9. An interactive robot comprising the voice recognizing apparatus as set forth in claim 6, wherein said robot executes speech and behavior according to a voice recognition result output from said voice recognizing unit.

10. An interactive robot connected to a server which performs a voice recognizing process via a network, wherein said server includes the voice recognizing apparatus as set forth in claim 6, and said server outputs a voice recognition result output from said voice recognizing unit to said robot via said network.

11. An interactive robot connected to a server which performs a voice recognition process via a network, wherein said server includes the voice recognizing apparatus as set forth in claim 6, and said server outputs a voice recognition result output from said voice recognizing unit to said robot via said network.

12. An interference reducing method comprising:

in the case of receiving a voice including an utterance voice uttered by a user speaker and an interference signal, estimating an interference component which interferes with recognition of said voice from information based on a position of a speaker or an utterance distance, and obtaining a reduction signal of reducing the influence of said interference component in said recognition of said voice by superimposing said reduction signal onto said voice; and superimposing said reduction signal on said voice and outputting the superimposed voice.

13. The interference reducing method as set forth in claim 12, further comprising:

detecting and outputting a position of a speaker whose voice should be input; and determining said reduction signal by using a distance between the user speaker obtained from said speaker position and an interference speaker as information based on the position of said speaker.

14. The interference reducing method as set forth in claim 12, further comprising:

measuring an utterance distance between the position of the speaker whose voice should be input and a voice input position and outputting the obtained utterance distance; and determining said reduction signal by using said utterance distance as information based on the utterance distance of said speaker.

15. The interference reducing method as set forth in claim 12, wherein said reduction signal is white noise.

16. A voice recognizing method using the interference reducing method as set forth in claim 12, further comprising:

performing a voice recognizing process on said superimposed voice.

17. A voice recognizing method using the interference reducing method as set forth in claim 12, wherein an input voice has a plurality of channels, and the voice recognizing method comprises:

determining a plurality of noise superimposition amounts for a plurality of channels of said input voice, respectively, on the basis of said plurality of channels of said input voice;

superimposing a plurality of noises according to said plurality of noise superimposition amounts for said plurality of channels of said input voice by said plurality of corresponding channels of said input voice and outputting the resultant voices as a plurality of noise-superimposed voices; and recognizing said plurality of noise-superimposed voices, respectively.

18. The voice recognizing method as set forth in claim 17, further comprising:

preparing a superimposition amount storing unit which previously stores an optimum noise superimposition amount associated with the relation of characteristic amounts of said utterance voice uttered by said user speaker and said interference signals;

obtaining, for each said plurality of channels of said input voice, said respective characteristic amounts of one of said plurality of channels of said input voice as said utterance voice and input voices of the other channels as said interference signals by said plurality of channels of said input voice;

obtaining said plurality of noise superimposition amounts corresponding to said relation of said characteristic amounts of said utterance voice and said interference signals with reference to said superimposition amount storing unit; and determining them as a plurality of noise superimposition amounts for said plurality of channels of said input voice, respectively.

19. A non-transitory computer readable medium storing an interference reducing program which makes a computer function as:

in the case of receiving a voice including an utterance voice uttered by a user speaker and an interference signal, a unit which estimates an interference component which interferes with recognition of said voice from information based on a position of a speaker or an utterance distance, and obtains a reduction signal of reducing the influence of said interference component in said recognition of said voice by superimposing said reduction signal onto said voice; and a unit which superimposes said reduction signal on said voice and outputs the superimposed voice.

20. The non-transitory computer readable medium storing an interference reducing program as set forth in claim 19, wherein said computer is further made function as a unit which detects a position of a speaker whose voice should be input and outputs the position, and said unit which obtains said reduction signal determines said reduction signal by using a distance between a user speaker obtained from said speaker position and an interference speaker as information based on the position of said speaker.

21. The non-transitory computer readable medium storing an interference reducing program as set forth in claim 19, wherein said computer is further made to function as a unit which measures an utterance distance between a position of a speaker whose voice should be input and a voice input position and outputs the obtained utterance distance, and a unit which obtains said reduction signal determines said reduction signal determines said reduction signal by using utterance distance as information based on the utterance distance of said speaker.

22. The non-transitory computer readable medium storing an interference reducing program as set forth in claim 19, wherein said reduction signal is white noise.

23. The non-transitory computer readable medium storing an interference reducing program as set forth in claim 19, the non-transitory computer readable medium further storing a voice recognizing program which makes a computer function as a unit which performs a voice recognizing process on said superimposed voice.

24. The non-transitory computer readable medium storing an interference reducing program as set forth in claim 19, the non-transitory computer readable medium further storing a voice recognizing program, wherein an input voice has a plurality of channels, and said program makes said computer function as:

a unit which determines a plurality of noise superimposition amounts for said plurality of channels of said input voice, respectively, on the basis of said plurality of channels of said input voice;

a unit which superimposes a plurality of noises according to said plurality of noise superimposition amounts for said plurality of channels of said input voice by said plurality of corresponding channels of said input voice by said plurality of corresponding channels of said input voice and outputs a plurality of noise-superimposed voices; and a unit which recognizes each of said plurality of noise-superimposed voices, respectively.

25. The non-transitory computer readable medium storing an interference reducing program and a voice recognizing program as set forth in claim 24, wherein said computer comprises a superimposition amount storing unit which previously stores an optimum noise superimposition amount associated with the relation of characteristic amounts of said utterance voice uttered by said user speaker and said interference signal, and said noise superimposition amount determining unit obtains, for each of said plurality of channels of said input voice, said respectively characteristic amounts of an input voice of one of said plurality of channels of said input voice as said utterance voice and input voices of the other channels as said interference signals, obtains said plurality of noise superimposition amounts corresponding to said relation of said characteristic amounts of said utterance voice and said interference signals with reference to said superimposition amount storing unit, and determines them as a plurality of noise superimposition amounts for said plurality of channels of said input voice, respectively.

* * * * *